United States Patent [19]
Hardy et al.

[11] 3,897,558
[45] July 29, 1975

[54] HYPOLIPEMIANT AND VASODILATATORY METHODS OF USE

[75] Inventors: Michael Hardy, Maisons-Alfort; Daniel Humbert, Paris, both of France

[73] Assignee: Roussel Uclaf, Paris, France

[22] Filed: Aug. 8, 1974

[21] Appl. No.: 495,555

[30] Foreign Application Priority Data
Aug. 29, 1973  France .............................. 73.31183

[52] U.S. Cl. ................................................ 424/270
[51] Int. Cl.² ....................................... A61K 27/00
[58] Field of Search ..................................... 424/270

[56] References Cited
OTHER PUBLICATIONS
Chem. Abst. 58 – 2525B, (1963).

*Primary Examiner*—Stanley J. Friedman
*Attorney, Agent, or Firm*—Hammond & Littell

[57] ABSTRACT

Novel hypolipemiant and vasodilatatory compositions containing as the active ingredient, 2-methyl-thiazole-5-methanol which has the formula

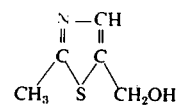

and a method of use.

2 Claims, No Drawings

HYPOLIPEMIANT AND VASODILATATORY METHODS OF USE

STATE OF THE ART 2-methyl-thiazole-5-methanol has been prepared by Zubarovskii et al [Chem. Ab; Vol. 58 (1963) p. 2525b] by reaction of ethyl 2-methyl-thiazole-5-carboxylate and lithium aluminum hydride but there were described no pharmacological properties for the compound.

OBJECTS OF THE INVENTION

It is an object of the invention to provide novel nypolipemiant and vasodilatatory compositions.

It is another object of the invention to provide a novel method of inducing hypolipemic and vasodilatatory activity in warm-blooded animals.

These and other objects and advantages of the invention will become obvious from the following detailed description.

The novel hypolipemiant and vasodilatatory compositions of the invention are comprised of an effective amount of 2-methyl-thiazole-5-methanol and a pharmaceutical carrier. The concentration of the active ingredient may be 5 to 95%, preferably 10 to 50%, by weight of the composition. The composition may be in the form of tablets, coated tablets, cachets, capsules, granules, emulsions, drops, syrups, suppositories or injectable solutions or suspensions.

The compositions have a marked hypolipemiant activity and a very prolonged vasodilatatory activity and therefore are useful for the treatment of hyperlipidemia, of coronary insufficencies, cardiac insufficencies of atheromatosis origin, of chronic anginic states and of functional troubles of hypertension.

The novel method of the invention for inducing hypolipemic and vasodilatatory activity in warm-blooed animals comprises administering to warm-blooded animals an effective amount of 2-methyl-thiazole-5-methanol. The product may be administered orally, rectally or transcutaneously. The usual daily dose is 2 to 50 mg/kg.

In the following examples there are described several preferred embodiments to illustrate the invention. However, it should be understood that the invention is not intended to be limited to the specific embodiments.

EXAMPLE 1

2-methyl-thiazole-5-methanol 2.54 g of lithium aluminum hydride were added under a nitrogen atmosphere at 20°–25°C to a solution of 10.5 g of methyl 2-methyl-thiazole-5-carboxylate in 105 ml of anhydrous tetrahydrofuran and the mixture was refluxed for 1 hour. After cooling of the solution, excess lithium aluminum hydride was destroyed by addition of ethyl acetate and then methanol. The mixture was filtered and the filtrate was evaporated by dryness. The residue was chromatographed over silica to obtain 7.6 g of 2-methyl-thiazole-5-methanol which was crystallized from isopropyl ether to obtain 5.28 g of the said product melting at 50°C.

EXAMPLE 2

Tablets weighing 750 mg were prepared from 500 mg of 2-methyl-thiazole-5-methanol, 112.5 mg of lactose, 70 mg of wheat amidon, 7.5 mg of treated amidon, 37.5 mg of rice amidon, 7.5 mg of magnesium stearate and 15 mg of talc.

EXAMPLE 3

Gelules were prepared from 500 mg of 2-methyl-thiazole -5-methanol, 15 mg of talc, 5 mg of magnesium stearate and 5 mg of Aerosil O.

PHARMACOLOGICAL STUDY

A. Acute toxicity

The acute toxicity of the product of the invention was determined on lots of 10 mice weighing between 18 and 22 g and the product was administered intraperitoneally. The animals were kept under observation for a week and the average lethal dose ($DL_{50}$) was graphically determined by the method of Dragstedt and Lang and it was above 500 mg/kg.

B. Hypolipemiant Activity

Male rats of the Sprague Dawley S.P.E. strain weighing 180 to 200 g were not fed for 24 hours and then received the product orally. One hour after the administration, the animals were killed and samples of the blood were obtained to determine the free fatty acids dosage. The extraction of the free fatty acids were done by the modified Dole technique [J. Lipid. Res. (1960)1,p. 199-202]. The plasmatic extract free of phospholipids was colorimetrically titrated by the automatic technique of Antonis [J. Lipid. Res. (1965), 6, p. 307–312] and the $DA_{50}$ dose was 1 mg/kg of the product. The test results show that the product was very clearly active against blood lipids.

C. Peripheric vasodilatatory Activity

The peripheric vasodilatatory effect was determined on non-pigmented ears rabbit and was manifested by the appearance of a reddening of the ears. The animals were not fed and the product was orally administered at different doses to determine the time of the reddening appearance of the ears and the duration and intensity of the reddening was noted on a scale of 0 to +++. The results are reported in the following Table.

| Dose | Latency | Duration | Intensity |
|---|---|---|---|
| 20 mg/kg | 5 min. | 96 min. | ++ |

The product has a clear peripheric vasodilatatory activity in this test.

Various modifications of the compositions and method of the invention may be made without departing from the spirit or scope thereof and it is to be understood that the invention is to be limited only as defined in the appended claims.

We claim:

1. A method of inducing hypolipemic and vasodilatatory activity in a warm-blooded animal comprising administering to a warm-blooded animal a hypolipemically and vasodilatatory effective amount of 2-methylthiazole-5-methanol.

2. The method of claim 1 wherein the product is administered orally.

* * * * *